(No Model.)
W. H. TURRENTINE.
FEEDING WATER TO BOILERS OF LOCOMOTIVES.
No. 264,494. Patented Sept. 19, 1882.
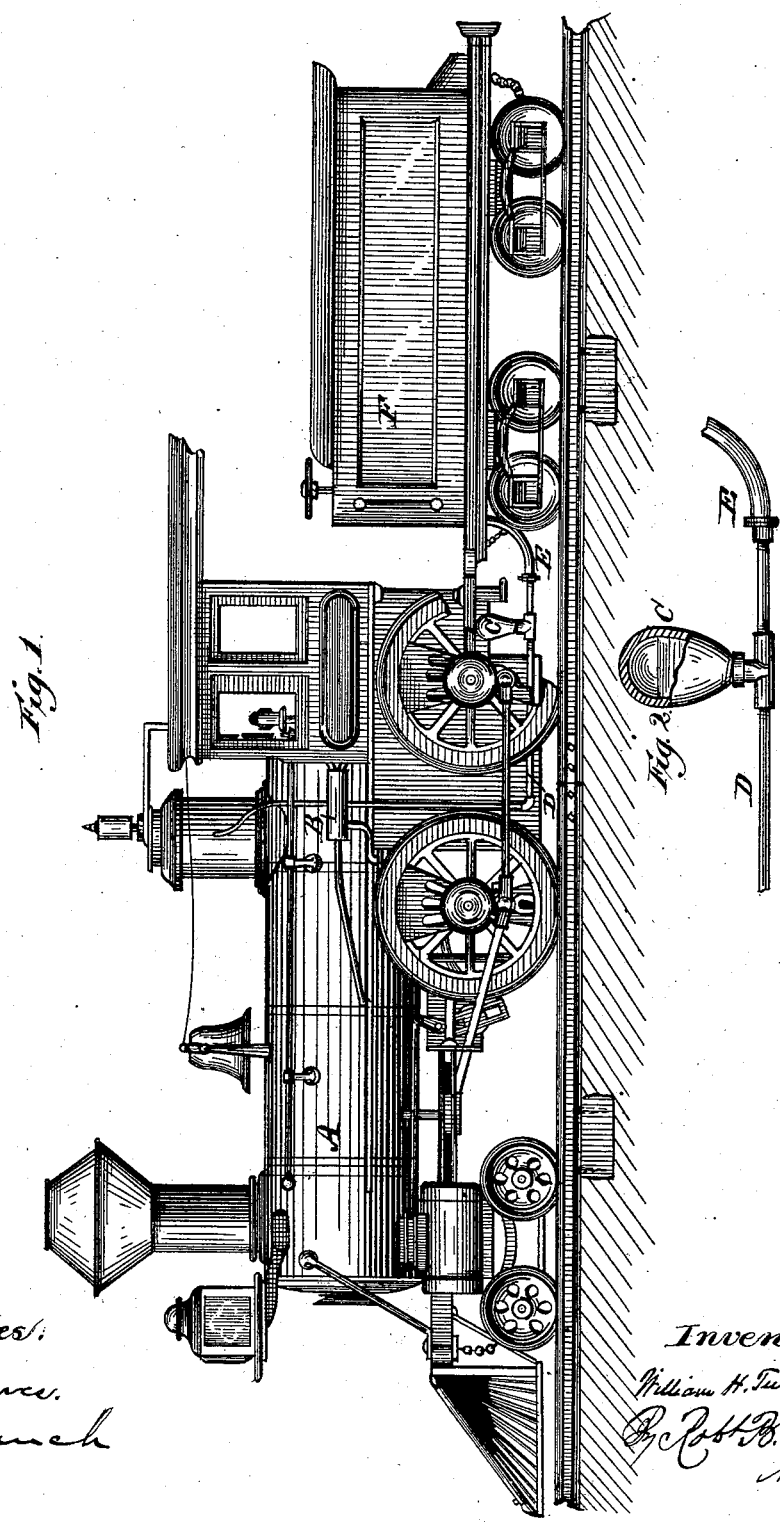

UNITED STATES PATENT OFFICE.

WILLIAM H. TURRENTINE, OF COMPANY SHOPS, NORTH CAROLINA.

FEEDING WATER TO BOILERS OF LOCOMOTIVES.

SPECIFICATION forming part of Letters Patent No. 264,494, dated September 19, 1882.

Application filed July 24, 1882. (No model.)

*To all whom it may concern:*

Be it known that I, WILLIAM H. TURRENTINE, a citizen of the United States, residing at Company Shops, in the county of Alamance and State of North Carolina, have invented certain new and useful Improvements in Feeding Water to Boilers of Locomotives, of which the following is a specification, reference being had therein to the accompanying drawings.

My invention relates to an improvement in feeding water to the boilers of locomotive-engines; and it consists in providing an air-chamber, which is connected to supply-pipe and located between the injector and the tender.

The use of injectors on locomotive-engines has been in a great measure ineffective, produced by what is known among locomotive-engineers as "breaking," which is caused by the feed-pipe getting filled with hot water, which results from the steam flowing through the injector and heating the water, thereby causing the instrument to fail to lift the water. To prevent this there must be a steady flow of water from the tender to the injector through the feed-pipe.

My invention is designed to remedy this defect by keeping up a constant supply of water; and it consists of a dome-shaped chamber, which is placed on the feed-pipe near the point where the hose from the tender connects with the usual supply-pipe to the injector.

Referring to the drawings forming a part of this specification, and in which like letters of reference indicate corresponding parts, Figure 1 is a side elevation of a locomotive and its tender, showing my improvement attached. Fig. 2 is a detail of the air-chamber and a connected section of the supply-pipe.

A is the boiler of the engine. B is the injector; C, the air-chamber; D E, the supply-pipe, and F is the tender.

The chamber, as already stated, is dome-shaped, and is made of any suitable metal, preferably brass or copper, and it is made perfectly air-tight. The chamber is secured to a piece of pipe of the same size as the supply-pipe, and one end of this pipe is either tapped or screw-threaded to secure it to the supply-pipe D, which is correspondingly tapped or threaded to receive it. The pipe at the other end is secured to the hose E by any suitable coupling. The chamber is attached to the supply-pipe in such manner that it stands between it and the frame of the engine. For a No. 7 injector the chamber should be from twelve to fourteen inches high and from eight to ten inches in diameter at the top, and tapered toward the bottom to fit a one-and-a-half-inch pipe, and for injectors of other sizes it should be substantially of the proportions named relatively.

The operation of the device is as follows, viz: When the water is turned on from the tender it compresses a portion of air in the chamber at the top, the remaining portion of the chamber being filled with water, as plainly shown in Fig. 2. The air in the upper portion of the chamber is compressed to a certain extent, varying somewhat according to the quantity of water in the tender, and when the engine makes a lurch and checks the flow of water from the tender, as is frequently the case with locomotive-engines running at a high speed or over a rough or curved road, the compressed air in the top of the chamber and above the water forces the latter into the feed-pipe, thus keeping up a constant supply.

Having thus fully described my improvement, what I claim, and desire to secure by Letters Patent, is—

The improvement in the art of feeding water to locomotive-boilers, herein described, which consists in combining with an injector an air-chamber connected with the supply-pipe, and located between the injector and the tender, substantially as set forth.

In testimony whereof I have affixed my signature in presence of two witnesses.

WILLIAM HOLT TURRENTINE.

Witnesses:
J. S. TURRENTINE,
G. B. HAIGH.